Patented June 19, 1951

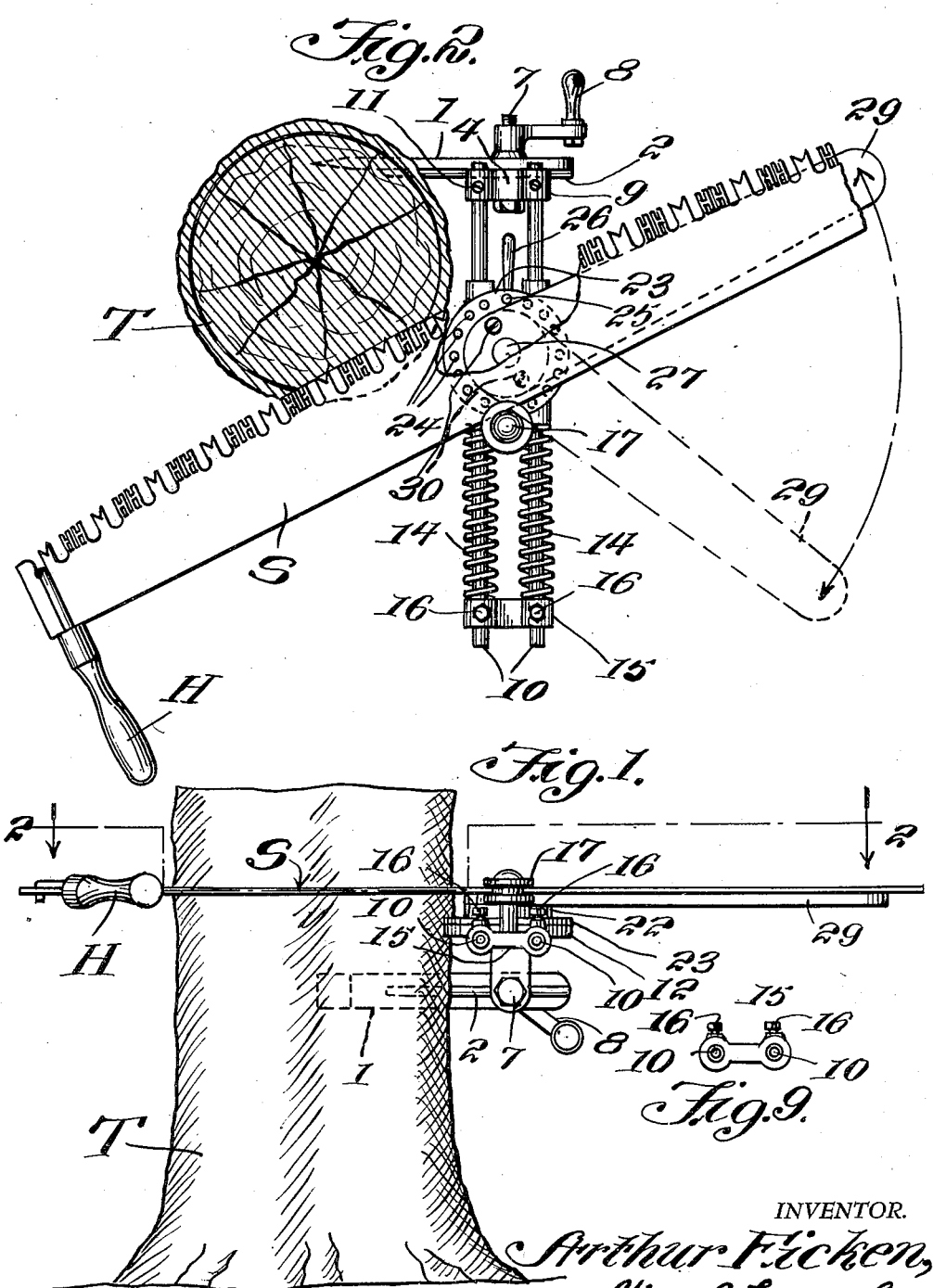

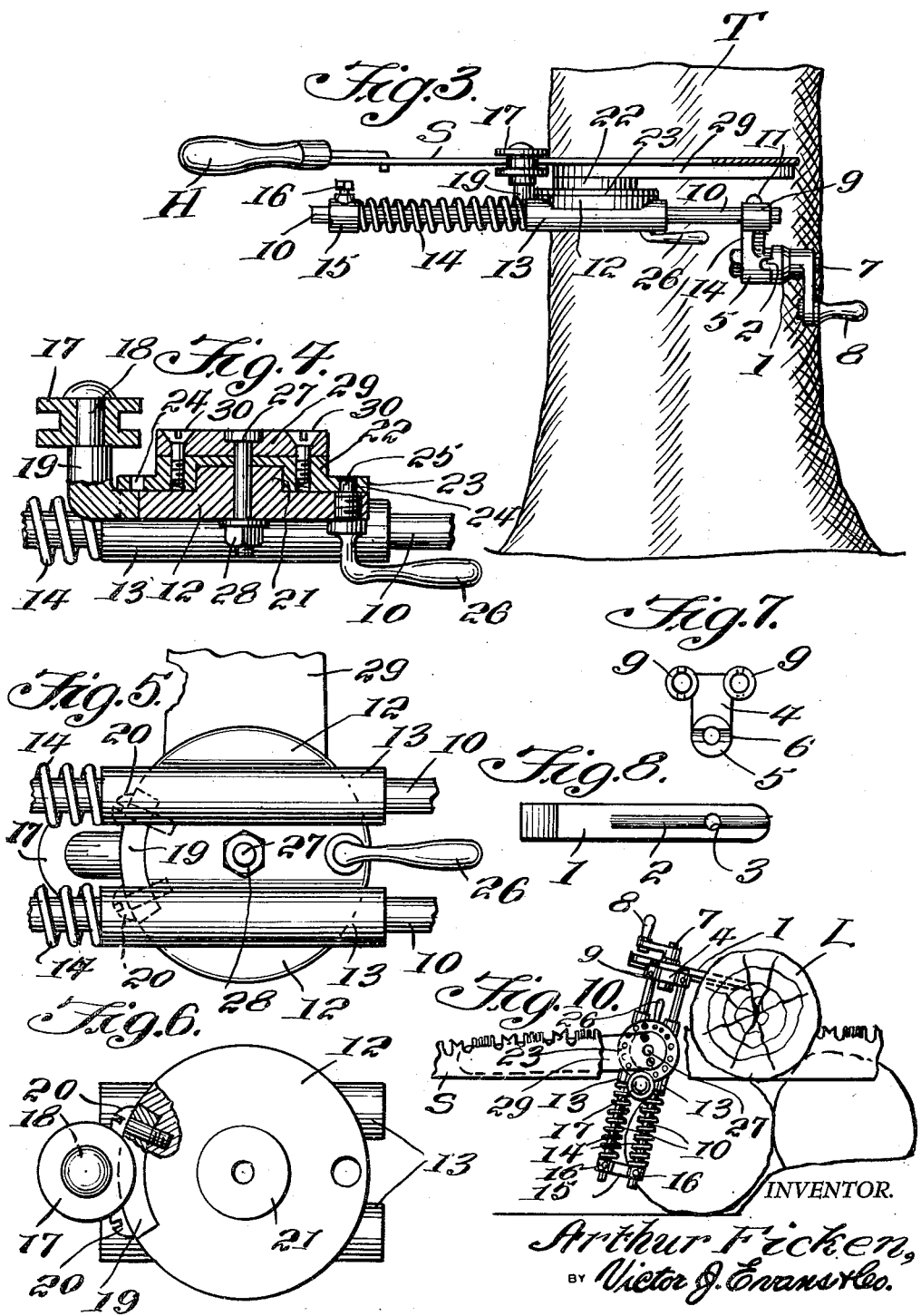

2,557,268

UNITED STATES PATENT OFFICE 2,557,268

CROSSCUT SAW GUIDING MECHANISM OF A ONE MAN TREE FELLER

Arthur Ficken, Sherwood, Oreg.

Application August 25, 1948, Serial No. 46,031

1 Claim. (Cl. 143—163)

The present invention relates generally to wood working and wood sawing, guiding and supporting mechanism for a single hand-operated reciprocating or cross cut saw, and more specifically to a cross-cut saw guiding mechanism of a one man tree feller embodying a novel saw guiding mechanism with means for attachment to a tree for a horizontal cut, and also adapted for attachment to a horizontal log for a vertical undercutting operation. The primary object of the invention is the provision of a portable attachment of comparatively light weight that may readily be manipulated by a sawyer and attached to a tree, or to a log, to support and guide the hand-operated saw in making a straight or level cut while felling a tree, or cutting a log into sections.

The saw-guiding appliance includes a minimum number of parts that may with facility be manufactured with low cost of production, and the parts may be assembled with convenience to provide a mechanism that may readily be adjusted and converted for different uses and assure a durable and reliable appliance of this character.

The invention consists in certain novel features of construction and combinations and arrangements of parts as will hereinafter be described and more particularly set forth in the appended claim.

In the accompanying drawings I have illustrated an example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures within the scope of my claim without departing from the principles of the invention.

Figure 1 is a view in elevation showing the appliance attached to a tree for horizontal cut; and Figure 2 is a top plan view of the structure in Fig. 1, at line 2—2.

Figure 3 is a view in elevation as seen from the right in Fig. 1.

Figure 4 is an enlarged detail sectional view of the resilient slide head of the saw-guide; Figure 5 is a bottom plan view of the slide head; and Figure 6 is a top plan view of the slide head.

Figure 7 is a face view of the three-point bracket for the attaching wedge or spike and guide rods; Figure 8 is a face view of the attaching wedge or spike; and Figure 9 (sheet 1) is a detail view of the adjustable bracket for the guide rods; and Figure 10 is a side view showing the appliance attached to a log for a vertical undercutting operation.

In order that the general relation and utility of parts may readily be understood I have shown in Figs. 1, 2, and 3, a portion of a tree T, with the saw S and its handle H supported by the guiding mechanism to make a horizontal cut above the attachment, so that the tree will be felled, leaving the attachment fastened to the tree. In Fig. 10 the saw guide is shown attached to a log L supported on top of two other logs for an undercut in a vertical plane, and the reciprocating saw cuts upwardly through the log while being resiliently pressed into continuous operating position.

For attaching the appliance to a tree or log, a spike or wedge 1 is driven by hammer-blows into the wood, preferably on a tangential line as seen in Fig. 2, and in Fig. 3 the spike is shown below the saw and the cut to be made thereby. As shown in the detail views (Figs. 7 and 8) the spike 1 is provided with a longitudinally extending rib or tongue 2 and an opening 3, through the spike 1 and rib or tongue 2, for attachment to a three-point bracket 4, and the bracket is provided with a lower perforated boss 5 with cross grooves 6 adapted to receive the tongue of the spike, and the grooves and tongue co-act to retain the attachment in fixed relation to the tree.

The bracket is retained in position by means of a bolt 7 having a crank handle 8 and the bolt passes through the opening 3 and perforated boss 5 of the spike and bracket respectively.

The bracket 4 is also provided with a pair of spaced perforated bosses 9, 9, in which two parallel guide rods 10, 10, are rigidly supported in adjusted position and held by set bolts 11 threaded in the bosses and impinging against the rods.

The two rigidly supported rods provide a support for an adjustable head that includes a circular base plate 12 that is equipped with a pair of integral sleeves 13, 13 slidable and adjustable on the rods, and two tension springs 14, 14 are coiled about the rods and interposed between an end bracket 15 and the sleeves, the end bracket being adjustable on the rods and held in adjusted position by set bolts 16.

The springs, under tension push against the sleeves to constantly hold the saw in working position, and for direct contact with the back edge of the saw a guide roller or presser wheel 17 having an exterior annular groove, is journaled on a stud or spindle 18 rigidly mounted on the base plate by bracket arm 19 and screws 20. In Fig. 2 as the saw is reciprocated, the springs through the base plate and presser wheel constantly feed the saw into the kerf being cut, and the handle end of the saw is swung around to the left to position indicated by the guide board 29 in dotted lines. In this position of the saw the tree has been cut on a horizontal plane to such an extent that it may be toppled and felled from the remaining stump.

The adjustable head may be initially located on the two rods in convenient position so that the reciprocating saw is resiliently clamped between the presser wheel and the tree and the wheel constantly advances the teeth of the saw in the kerf as the cutting progresses.

The base plate of the slide head is fashioned with a circular centering boss 21 for a countersunk cap 22 having an exterior annular flange 23 that is provided with an annular series of holes 24, and the cap plate 22 is rotatably adjustable on the base plate. For retaining the cap plate in adjusted position the pin 25 of a lock bolt 26 is entered in a selected hole of the annular series, and the bolt is provided with a crank handle for convenience in quickly turning the bolt as it is threaded in the base plate of the slide head.

A guide board 29 for the saw is fastened to the rotatably adjustable cap by means of the center bolt 27 that is passed through the board, the cap plate and the base plate, and a nut 28 on the bolt retains these parts in position.

In addition, the inner end of the board is fixed to the cap plate by means of screws 30.

The board has a flat plane face for supporting the reciprocating saw, and the saw glides over the board in level position to prevent buckling, and to insure a straight cut through the work, and as the sawyer swings the saw around the tree the board moves with the saw swinging on a plane from full line position to the dotted line position of Fig. 2.

In Fig. 10, where the presser wheel is holding the saw in the kerf of the log as it cuts from the lower portion of the log, the saw and the guide board are swung upwardly at the left hand side of the log as the kerf advances through the log.

Having thus fully described my invention, what I claim as new and desire to secure by Letters Patent is:

In a saw guide for a reciprocable saw, the combination with a frame including a pair of parallel rods, an end bracket connecting the ends of said rods, a mounting bracket connecting the other ends of said rods and means carried by the mounting bracket for rigidly mounting the rods on work to be sawed, of a circular base plate, a pair of spaced parallel sleeves on said base plate integral therewith and slidable on said rods, a tensioning spring on each rod interposed between the end bracket and the respective sleeve, means carried by the end bracket and coacting with the rods to adjust the end bracket to vary the tension of the spring, a spindle on said base plate and extending therefrom in perpendicular relation thereto, an annular grooved presser wheel rotatably mounted on said spindle for rolling engagement with the saw, a circular centering boss on said base plate, a counter sunk cap having an exterior annular flange mounted on said boss, a guide board fixed to the cap, means passing through said base plate, cap and guide board for rotatably mounting the cap and guide board on the base plate, said base plate having an annular row of relatively spaced openings in said cap, means carried by said base plate and coacting with said openings to retain said cap in adjusted relation with said base plate, and said guide board engaging said saw to prevent buckling of the saw, and said tension springs urging said wheel into engagement with said saw to urge said saw into the kerf being cut in the work.

ARTHUR FICKEN.

REFERENCES CITED

The following references are of record in the file of this patent:

UNITED STATES PATENTS

| Number | Name | Date |
|---|---|---|
| 938,559 | Cuyler | Nov. 2, 1909 |
| 945,773 | Fagan | Jan. 11, 1910 |
| 969,240 | Baker | Sept. 6, 1910 |
| 977,755 | Smith | Dec. 6, 1910 |
| 1,198,580 | Risdon | Sept. 19, 1916 |
| 2,092,184 | Ringer | Sept. 7, 1937 |
| 2,125,395 | Olson | Aug. 2, 1938 |
| 2,376,270 | Paulson | May 15, 1945 |